United States Patent
Ho et al.

(10) Patent No.: US 7,685,614 B2
(45) Date of Patent: Mar. 23, 2010

(54) OPTICAL DISK DRIVE

(75) Inventors: Chun-Lung Ho, Taipei (TW); Yi-Cheng Tsao, Taipei (TW)

(73) Assignee: LITE-ON IT Corporation, Hsinchu (TW)

( * ) Notice: Subject to any disclaimer, the term of this patent is extended or adjusted under 35 U.S.C. 154(b) by 0 days.

(21) Appl. No.: 12/236,476

(22) Filed: Sep. 23, 2008

(65) Prior Publication Data

US 2009/0019465 A1   Jan. 15, 2009

Related U.S. Application Data

(62) Division of application No. 11/162,275, filed on Sep. 5, 2005, now Pat. No. 7,448,266.

(30) Foreign Application Priority Data

Jun. 30, 2005  (TW) ............... 94122072 A

(51) Int. Cl.
  *G11B 33/08* (2006.01)
  *G11B 17/028* (2006.01)
  *G01M 1/16* (2006.01)
  *G11B 19/20* (2006.01)

(52) U.S. Cl. ............. 720/717; 720/704; 720/701; 73/461

(58) Field of Classification Search ............. 73/461, 73/468, 469, 470; 74/572.2; 720/701, 717, 720/704, 709; 369/264, 270.1, 271.1
See application file for complete search history.

(56) References Cited

U.S. PATENT DOCUMENTS

| | | | |
|---|---|---|---|
| 2002/0040891 A1* | 4/2002 | Hong et al. | 219/121.68 |
| 2002/0071206 A1* | 6/2002 | Choo et al. | 360/99.12 |
| 2003/0193738 A1* | 10/2003 | Renken | 360/98.07 |
| 2005/0047003 A1* | 3/2005 | Nakamiya et al. | 360/99.08 |

FOREIGN PATENT DOCUMENTS

| | | | | |
|---|---|---|---|---|
| JP | 11176078 A | * | 7/1999 |
| JP | 2000100062 A | * | 4/2000 |
| JP | 2001211613 A | * | 8/2001 |

* cited by examiner

*Primary Examiner*—William J Klimowicz
(74) *Attorney, Agent, or Firm*—Jianq Chyun IP Office

(57) ABSTRACT

An optical disk drive is adapted for reading data from an optical disk. The optical disk drive includes a housing, a tray, and a read module. The tray is disposed in the housing and is adapted for ejecting from the housing. The read module is adapted for reading data from an optical disk. The read module includes a turntable and an optical read head. The turntable includes a number of engaging springs, in which at least one of the engaging springs include added material for superposing the center of the optical disk and the center of the turntable. Furthermore, the optical read head is adapted to move along a tracking path for reading data from the optical disk.

4 Claims, 8 Drawing Sheets

OPTICAL DISK DRIVE

CROSS-REFERENCE TO RELATED APPLICATION

This application is a divisional of an application Ser. No. 11/162,275, filed on Sep. 5, 2005, now U.S. Pat. No. 7,448,266, which claims the priority of Taiwan application serial no. 94122072, filed on Jun. 30, 2005. The entirety of each of the above-mentioned patent applications is hereby incorporated by reference herein and made a part of this specification.

BACKGROUND OF THE INVENTION

1. Field of the Invention

The present invention relates to a fabrication method of an optical disk drive. In particular, it relates to a fabrication method of an optical disk drive which can solve the eccentric issues of optical disk placed on a turntable.

2. Description of Related Art

Because of having advantages of lower price, better portability, larger storage volume, easier storage, longer storage duration, lower cost, and data robustness, optical disks have gradually replaced conventional magnetic storage medium as an indispensable storage medium. As a result of the widespread use of the optical disk; therefore, the optical disk drive for reading optical disks has consequently become popular electronic products.

FIG. 1 is a schematic three-dimensional exploding view of a conventional optical disk drive. The conventional optical disk drive 10 includes a housing 12, a tray 14, and a read module 16. The housing 12 is adapted for receiving and protecting the inner components of the optical disk drive 10. The tray 14 is disposed in the housing 12 and is adapted for ejecting from the housing 12 for carrying an optical disk D. Furthermore, the read module 16, including a turntable 16a and an optical read head 16b, is disposed in the housing 12, and is adapted for reading data from the optical disk.

The process of reading data from an optical disk using an optical disk drive 10 includes the following steps: first, an optical disk D is loaded on the tray 14, and the tray 14 together with the loaded optical disk D are slid into the housing 12. A plurality of engaging springs 16c disposed on the turntable 16a are used to secure the optical disk. And then the turntable 16a drives the optical disk to rotate at an appropriate velocity, while an optical read head 16b moves along a tracking path for reading data from the optical disk.

Unfortunately, being small and thin, the aforementioned engaging springs are likely to be deformed during fabrication, which may leads to problems in the eccentric issues of a circle defined by the edges of the engaging springs. Therefore, when an optical disk is supported by a turntable and secured by the engaging springs, the optical disk may become eccentric from the center of the turntable. Thus the optical read head is difficult to read data from the optical disk. And particularly in a high-speed optical disk drive, the aforementioned eccentric problem easily leads to failure in reading data from the optical disk.

SUMMARY OF THE INVENTION

In view of the above, the present invention is directed to a fabrication method of an optical disk drive, which solves the eccentric issue of optical disk loaded in the optical disk drive, and thus improving product quality and saving production cost for optical disk drive.

According to the aforementioned, the present invention provides a fabrication method of an optical disk drive, adapted for improving the eccentric issue of a loaded optical disk. The optical disk drive, for example, includes a turntable having a plurality of engaging springs, in which the engaging springs are adapted for securing the optical disk through a hole in the center of the optical disk. The steps for fabricating the optical disk drive include the following: First, the eccentric degree of the optical disk caused by the engaging springs is measured, and a result is obtained. Then according to the result, material is added to at least one of the engaging springs, or a part of the original material is removed from at least one of the engaging springs.

According to an embodiment of the invention, the method for obtaining the aforementioned result, for example, includes the following steps: First, a testing apparatus including a first support unit, a testing plate, and a sensing device is provided, in which the testing plate has an inner hole and a peripheral region, where the center of the inner hole and the center of the peripheral region are superposed. Then the turntable is secured on the first support unit, and the testing plate is secured on the turntable. The turntable is used to drive the testing plate to rotate. The eccentric degree of the peripheral region related to the center of the turntable is measured using the sensing device.

According to an embodiment of the invention, the steps for adding material to an engaging spring includes the following: a material adding device is provided and the material is added to at least one engaging spring using the material adding device.

According to another embodiment of the invention, the material added to the engaging spring can be either the same material or not the same material with the original material of the engaging spring.

According to another embodiment of the invention, the steps for removing a part of the original material from an engaging spring includes the following: A second support unit and a material removing device are provided. Later the turntable is secured on the second support unit. Then the second support unit drives the turntable to rotate. A part of the original material of at least one engaging spring is removed using the material removing device.

According to the aforementioned, the present invention provides a fabrication method of an optical disk drive, adapted for improving the eccentric problem of a loaded optical disk. The optical disk drive, for example, includes a turntable having a plurality of engaging springs, in which the engaging springs are adapted for securing the optical disk through a center hole of the optical disk. The steps for fabricating the optical disk drive include the following: First, the eccentric degree of the optical disk caused by the engaging springs is measured and a result is obtained. Then according to the obtained result, material is added to at least one of the engaging springs; and a part of the previously added material is removed from at least one of the engaging springs.

According to an embodiment of the invention, the method for obtaining the aforementioned test result, for example, includes the following steps: First, a testing apparatus including a first support unit, a testing plate, and a sensing device is provided, in which the testing plate has an inner hole and a peripheral region. The center of the inner hole and the center of the peripheral region are superposed. A turntable is secured on the first support unit. Then the testing plate is secured on the turntable. Then the turntable drives the testing plate to rotate. Later, the eccentric degree of the peripheral region related to the center of the turntable is measured using the sensing device.

According to an embodiment of the invention, the steps for adding material to an engaging spring and for removing a part of the previously added material from the engaging spring includes the following: First, a second support unit, a material adding device, and a material removing device are provided. Then material is added to at least one of the engaging spring using the material adding device. A turntable is secured on the second support unit. Later, the second support unit drives the turntable to rotate. Furthermore, a part of previously added material is removed from the engaging spring using the material removing device.

According to another embodiment of the invention, the material added to the engaging spring can be either the same or not the same material with the original material for making the engaging spring.

According to the aforementioned, the present invention provides an optical disk drive, which is adapted for reading data from an optical disk. The optical disk drive includes a housing, a tray, and a read module. The tray is disposed in the housing and is adapted for ejecting from the housing. The read module is adapted for reading data from an optical disk. The read module includes a turntable and an optical read head. The turntable includes a plurality of engaging springs, in which at least one of the engaging springs include added material for superposing the center of the optical disk and the center of the turntable. Furthermore, the optical read head is adapted to move along a tracking path for reading data from the optical disk.

According to another embodiment of the invention, the material added to the engaging spring can be either the same or not the same with the original material for the engaging spring.

According to the aforementioned, the present invention provides an optical disk drive, which is adapted for reading data from an optical disk. The optical disk drive includes a housing, a tray, and a read module. The tray is disposed in the housing and is adapted for ejecting from the housing. The read module is adapted for reading data from an optical disk. The read module includes a turntable and an optical read head. The turntable includes a plurality of engaging springs. At least one of the engaging springs includes a corresponding portion wherein a part of material is removed for superposing the center of the optical disk and the center of the turntable. Furthermore, the optical read head is adapted for moving along a tracking path for reading data from the optical disk.

In view of the above, after testing and modification using the fabrication method of an optical disk drive according to the present invention, the engaging springs of the turntable makes the center of the optical disk and the center of the turntable to be superposed. Therefore, when a user is using the optical disk drive, the reading speed and the reliability of the read data are all largely increased. Also, the fabrication method of an optical disk drive according to the invention can increase product qualities, thus the production cost is reduced.

The accompanying drawings are included to provide a further understanding of the invention, and are incorporated in and constitute a part of this specification. The drawings illustrate embodiments of the invention and, together with the description, serve to explain the principles of the invention.

BRIEF DESCRIPTION OF THE DRAWINGS

FIG. 5B is a schematic diagram for illustrating an optical disk drive after the completion of the steps in FIGS. 3A and 5A.

DESCRIPTION OF THE EMBODIMENTS

The First Embodiment

Figure 1:
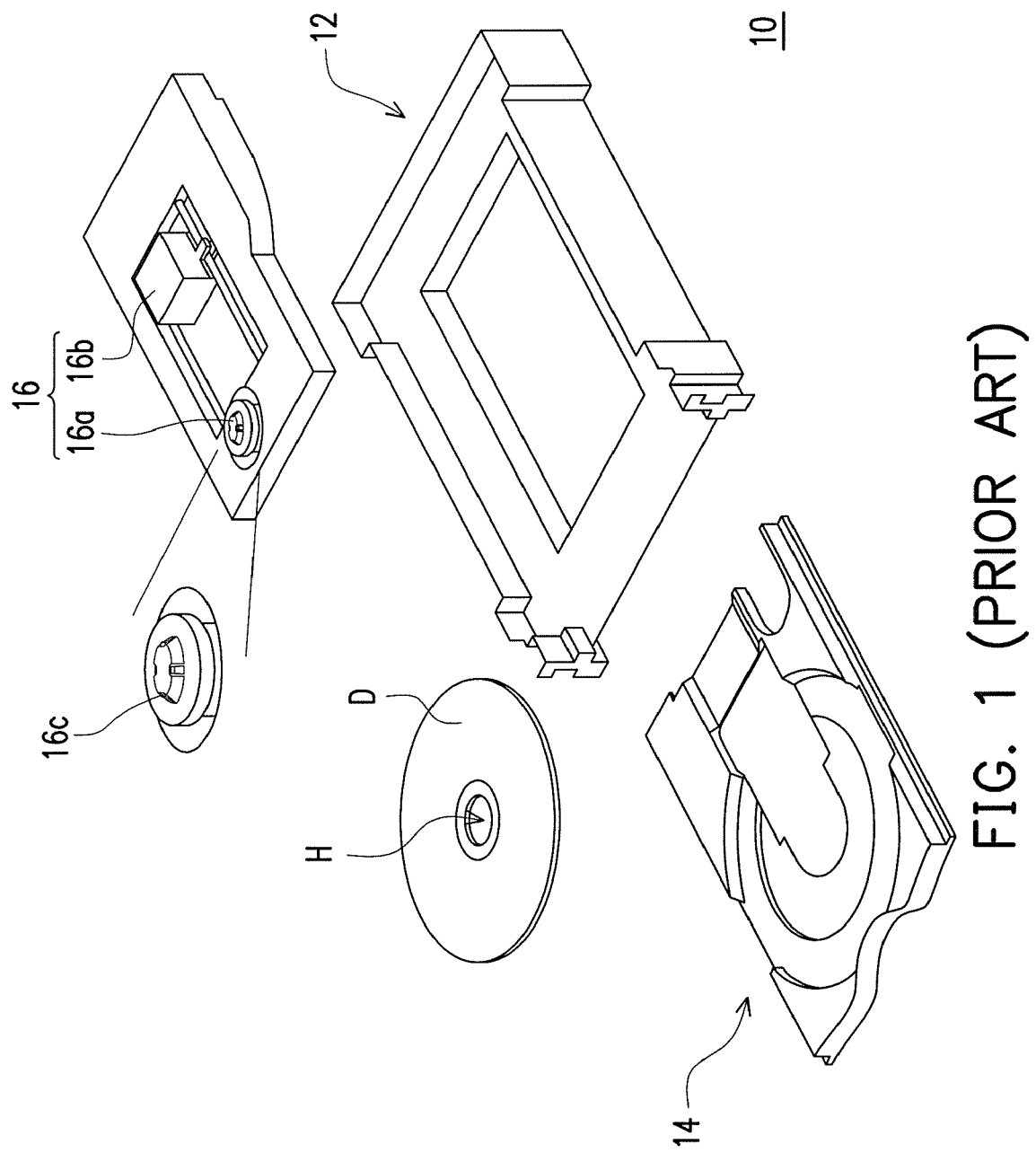
FIG. 1 is a schematic exploding perspective view of a conventional optical disk drive.

FIG. 1 is a schematic three-dimensional exploding perspective view of a conventional optical disk drive. Referring to FIG. 1, a conventional optical disk drive 10 includes a turntable 16a having a plurality of engaging springs 16c. The engaging spring 16c is adapted for securing an optical disk D through the hole H in the center of the optical disk D. The centricity of the engaging springs 16c related to the center of the turntable 16a will influence which of the optical disk D. Therefore, the present invention provides a fabrication method of an optical disk drive by which the issues of the eccentric problem of optical disk can be solved. The fabrication method according to the first embodiment includes the following steps: First, the eccentric degree of the optical disk D caused by the engaging spring 16c is measured and a testing result is obtained. According to the obtained test results, material is added to at least one of the engaging springs 16c. Or a part of the original material is removed from at least one of the engaging spring 16c.

Figure 2A:
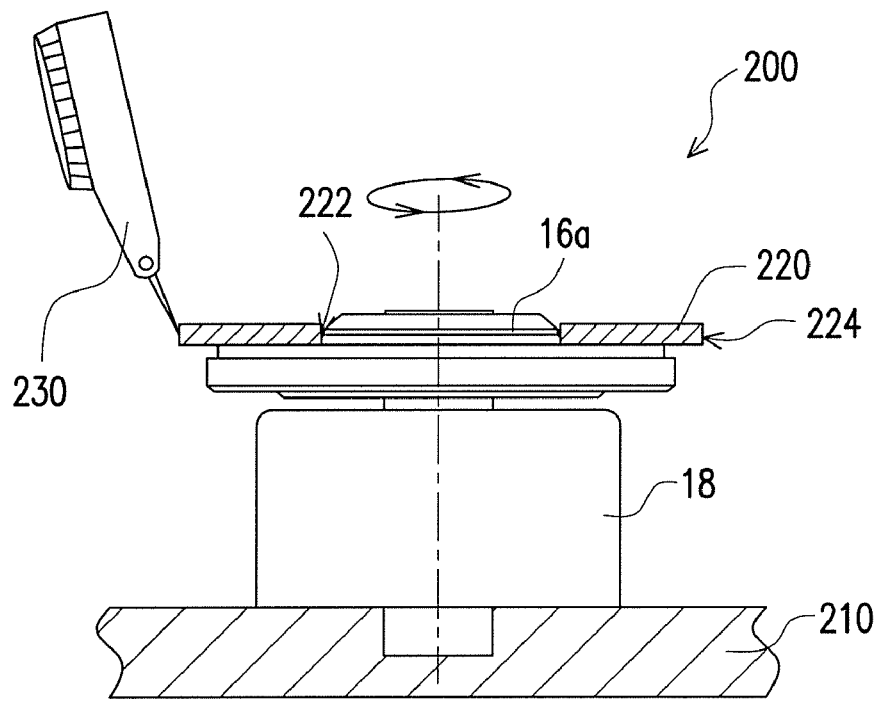
FIG. 2A is a schematic diagram for illustrating a testing apparatus having a first support unit with no rotating function, according to a first embodiment of the invention.

Referring to FIG. 2A, it is a schematic diagram illustrating a testing apparatus having a first support unit with no rotating function, according to a first embodiment of the invention. The method for obtaining the testing result includes the following steps: First, a testing apparatus 200 is provided. The testing apparatus 200 includes a first support unit 210, a testing plate 220, and a sensing device 230, in which the testing plate 220 has an inner hole 222 and a peripheral region 224. The center of the inner hole 222 and the center of the peripheral region 224 are superposed. In other words, both the inner hole 222 and the peripheral region 224 have perfect roundness, and are concentric.

Later, a turntable 16a is secured on the first support unit 210. Then the testing plate 220 is secured on the turntable 16a. The turntable 16a is used to drive the testing plate 220 to rotate. The sensing device 230 measures the eccentric degree of the peripheral region 224 related to the center of the turntable 16a which is caused by the eccentric engaging springs.

Figure 2B:
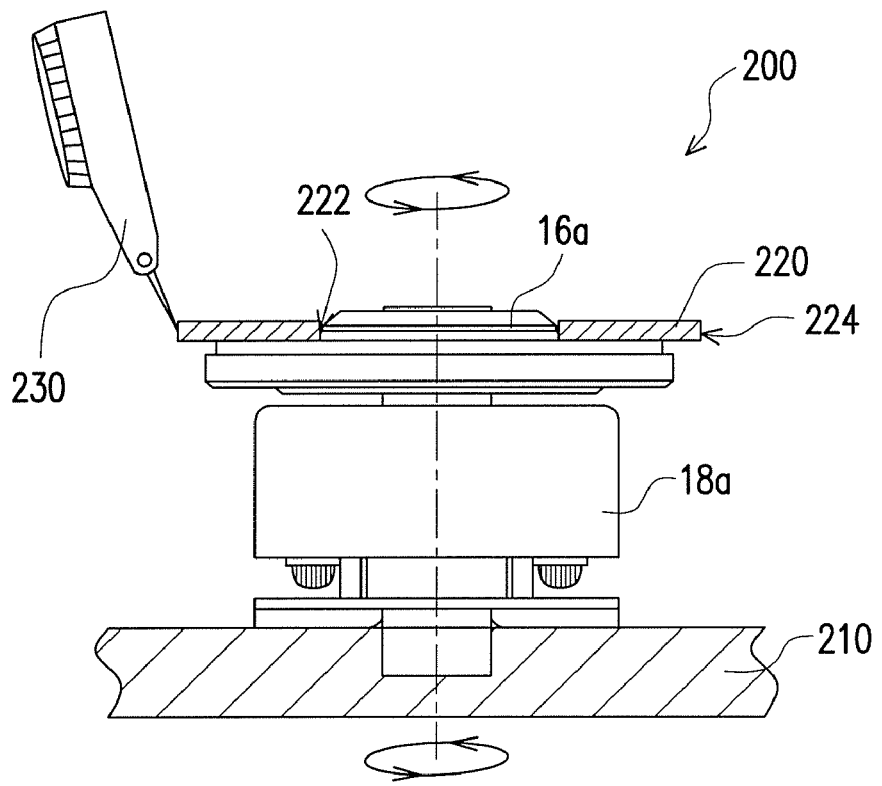
FIG. 2B is a schematic diagram for illustrating a testing apparatus having a first support unit with rotating function, according to the first embodiment of the invention.

It should be noted that there are at least two optional approaches for securing the turntable 16a on the first support unit 210. The first is to secure the turntable 16a together with a motor 18 which is connected with the turntable 16a onto the first support unit 210. Because the motor 18 already has rotating capability; therefore, the first support unit 210 has the motor 18 secured on it and supplies power to the motor 18 to drive the turntable 16a. FIG. 2B is a schematic diagram for illustrating a testing apparatus having a first support unit with rotating function, according to the first embodiment of the invention. Referring to FIG. 2B, the second approach is to secure the turntable 16a together with a motor rotor 18a, which is coupled with the turntable 16a onto the first support unit 210. Since there is no relative motion between the turntable 16a and the motor rotor 18a, the first support unit 210 has the rotating function for driving the turntable 16a to rotate concurrently with the testing plate 220.

The sensing device 230 may further include a probe. And it measures the aforementioned eccentric degree by touching the peripheral region 224. The sensing device 230 may also measure the aforementioned eccentric degree by using approaches other than touching the peripheral region 224, for example, by using eddy current or infrared rays to measure the eccentric degree (not shown in figures).

Figure 3A:
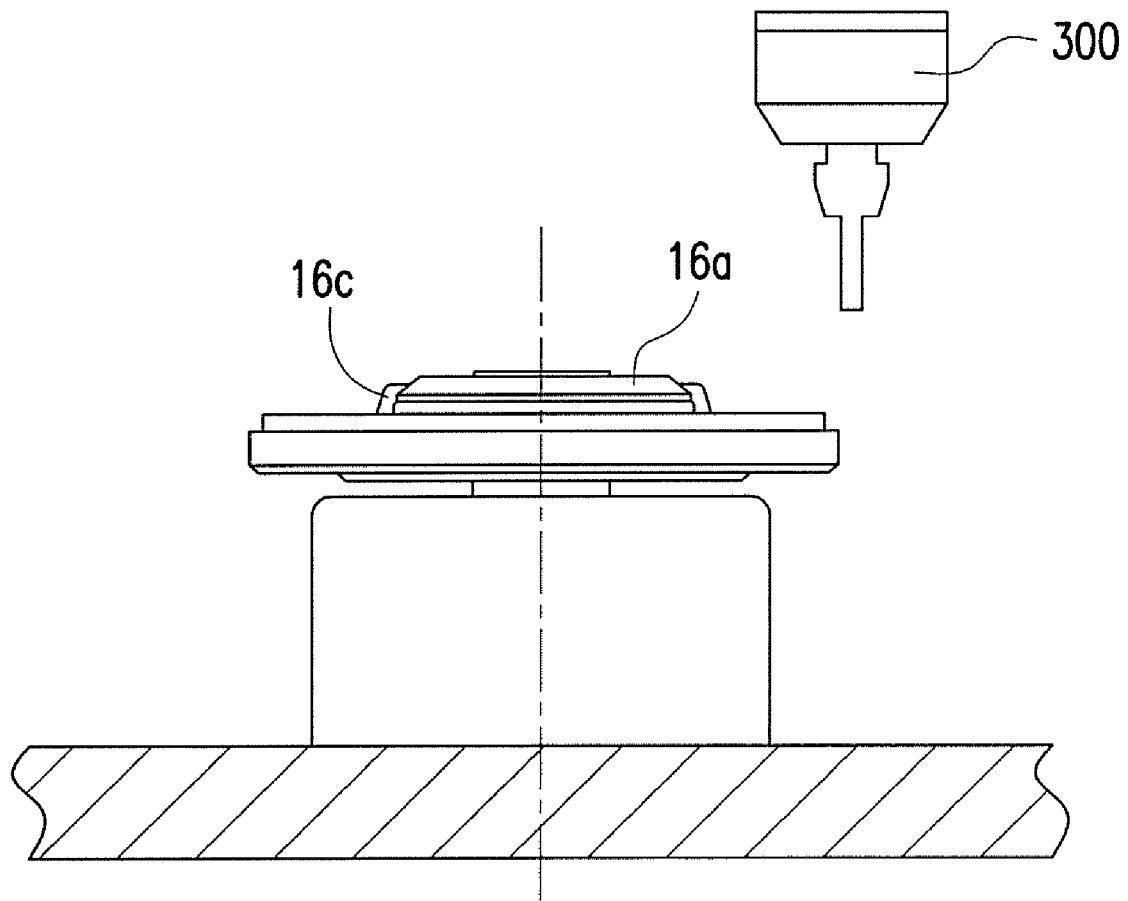
FIG. 3A is a schematic diagram for illustrating a process of a material adding device adding a material to an engaging spring, according to the first embodiment of the invention.

Referring to FIG. 3A, it illustrates a process of a material adding device which adds material to an engaging spring, according to the first embodiment of the invention. The steps for adding material to an engaging spring includes the following: First, a material adding device 300 is provided. And then material is added to at least one engaging spring 16c of the turntable 16a using the material adding device 300. It is to be noted that the material added to the engaging spring 16c can be either the same or not the same with the engaging spring 16c.

Figure 3B:
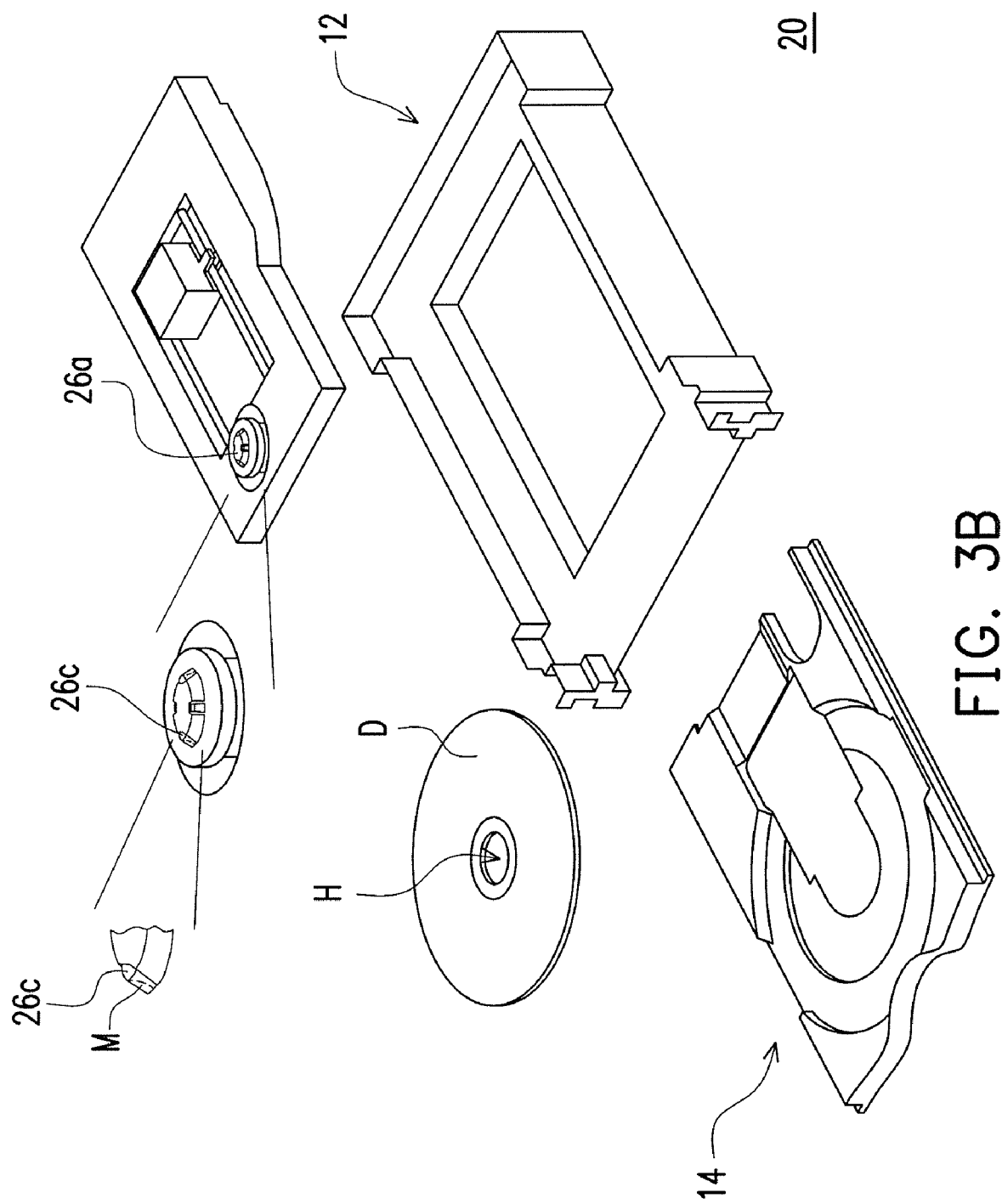

FIG. 3B is a schematic diagram for illustrating an optical disk drive after the completion of steps of FIG. 3A. By referring to FIG. 3B and FIG. 1 together, the optical disk drive 20 is different from the conventional optical disk drive 10 in that at least one engaging spring 26c of the turntable 26a has an added material M for superposing the center of the optical disk D and the center of the turntable 26a.

Figure 4A:
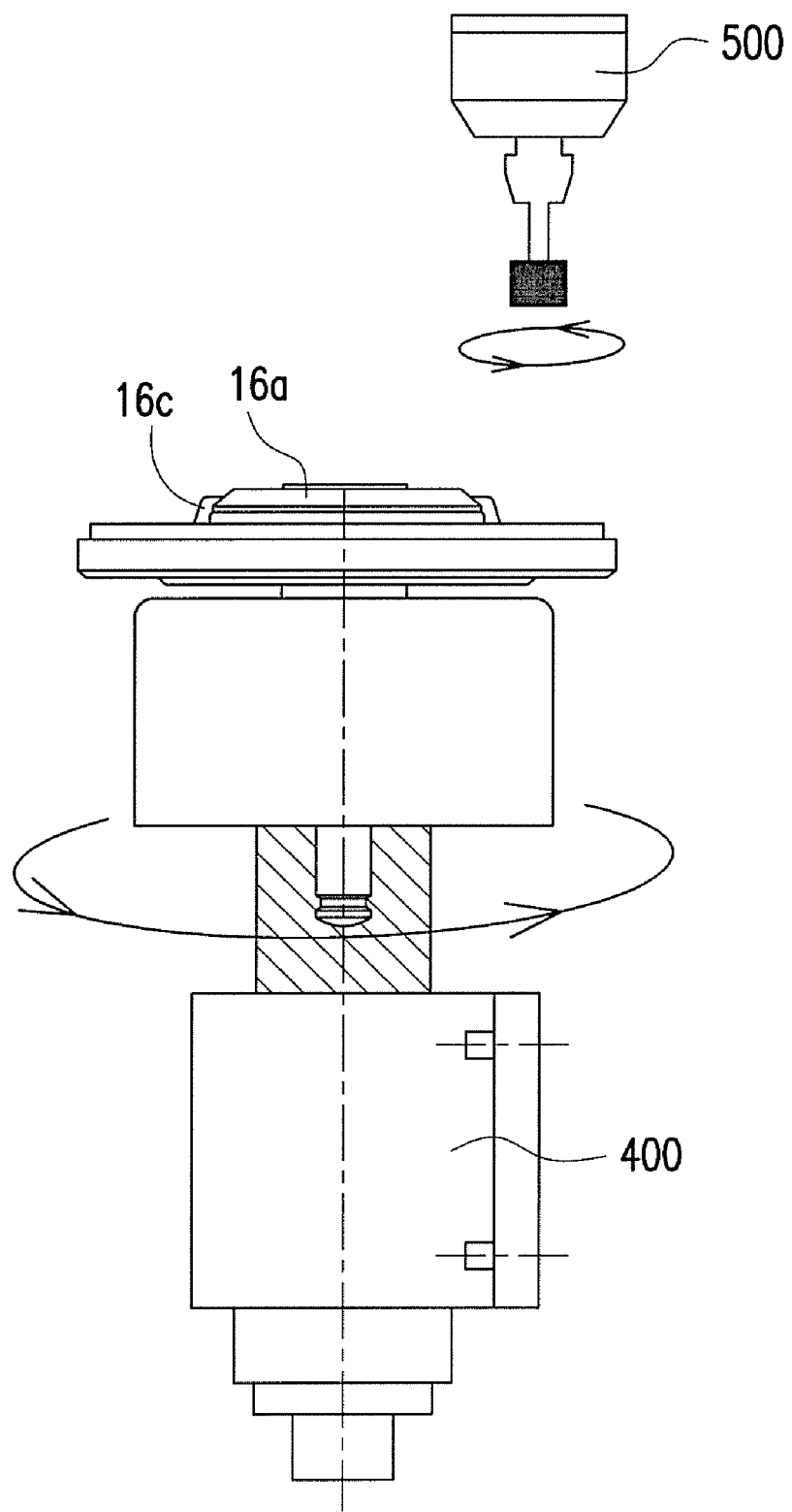
FIG. 4A is a schematic diagram for illustrating a material removing device for removing a part of the original material from the engaging spring, according to the first embodiment of the invention.

FIG. 4A is a schematic diagram for illustrating a material removing device for removing a part of raw material from the engaging spring, according to the first embodiment of the invention. Referring to FIG. 4A, the aforementioned steps for removing a part of the original material from an engaging spring includes the following: First, a second support unit 400 and a material removing device 500 are provided. Then the turntable 16a is secured on the second support unit 400. In addition, the second support unit 400 is made to drive the turntable 16a to rotate. A part of the original material is removed from at least one engaging spring 16c using the material removing device 500. It should be noted that there are at least two optional approaches for securing the turntable 16a on the second support unit 400, which are respectively the same as the two approaches for securing the turntable 16a on the first support unit 210 as illustrated in FIGS. 2A and 2B.

Figure 4B:
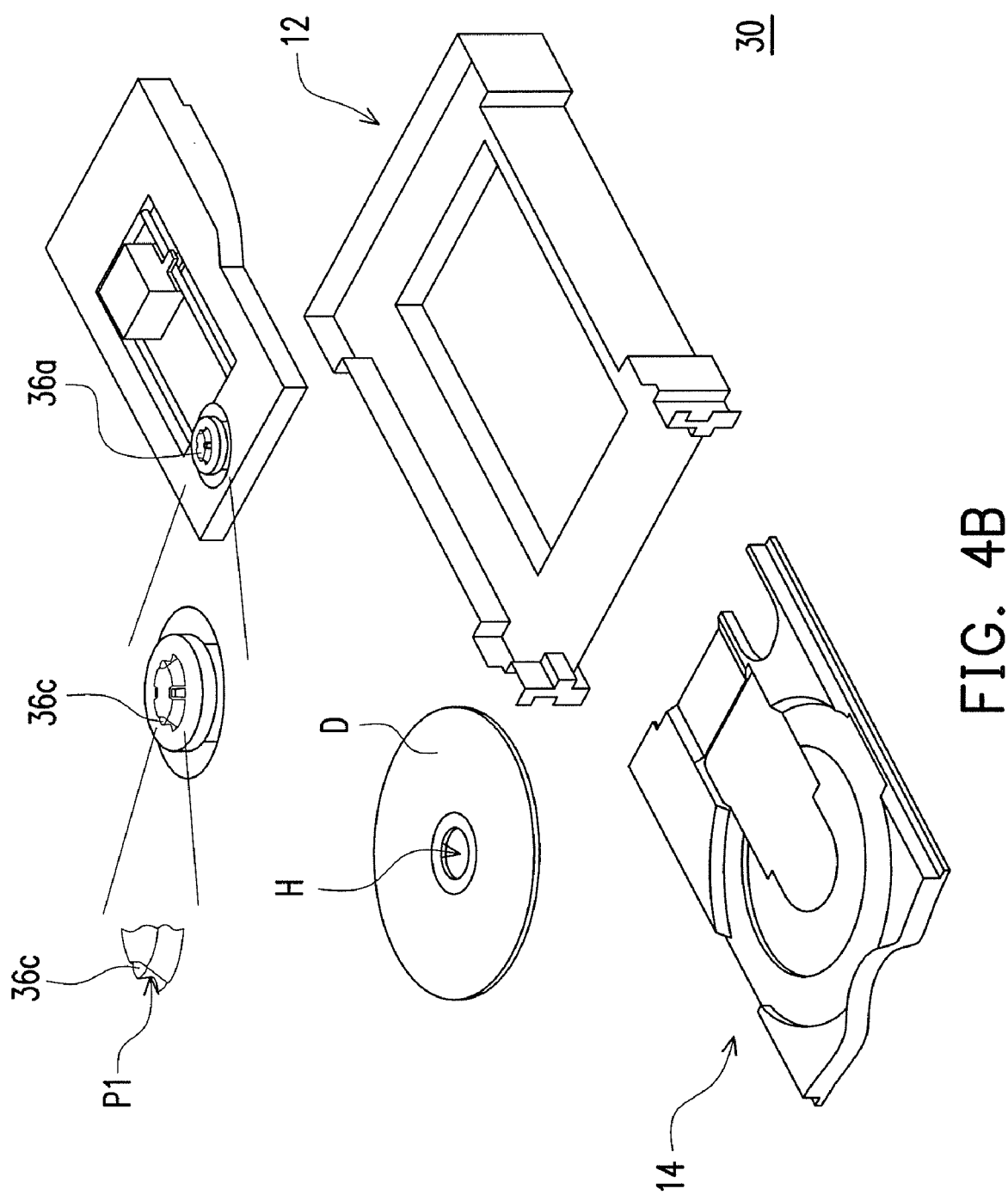
FIG. 4B is a schematic diagram for illustrating an optical disk drive after the completion of the steps in FIG. 4A.

FIG. 4B is a schematic diagram for illustrating an optical disk drive after completion of the steps of FIG. 4A. Referring to FIG. 4B and FIG. 1, the optical disk drive 30 is different from the conventional optical disk drive 10 in that the turntable 36a includes at least one engaging spring 36c having a corresponding portion P1 wherein a part of material is removed, and the corresponding portion P1 being adapted for making the center of the optical disk D and the center of the turntable 36a being superposed.

The Second Embodiment

The fabrication method of an optical disk drive according to the second embodiment of the invention includes the following steps: First, the eccentric degree of the optical disk D caused by the engaging spring 16c (as shown in FIG. 1) is measured, and a result is obtained. Furthermore, according to the obtained result, material is added to at least one of the engaging springs 16c; and then a part of the previously added material is removed from at least one of the engaging springs 16c.

Figure 5A:
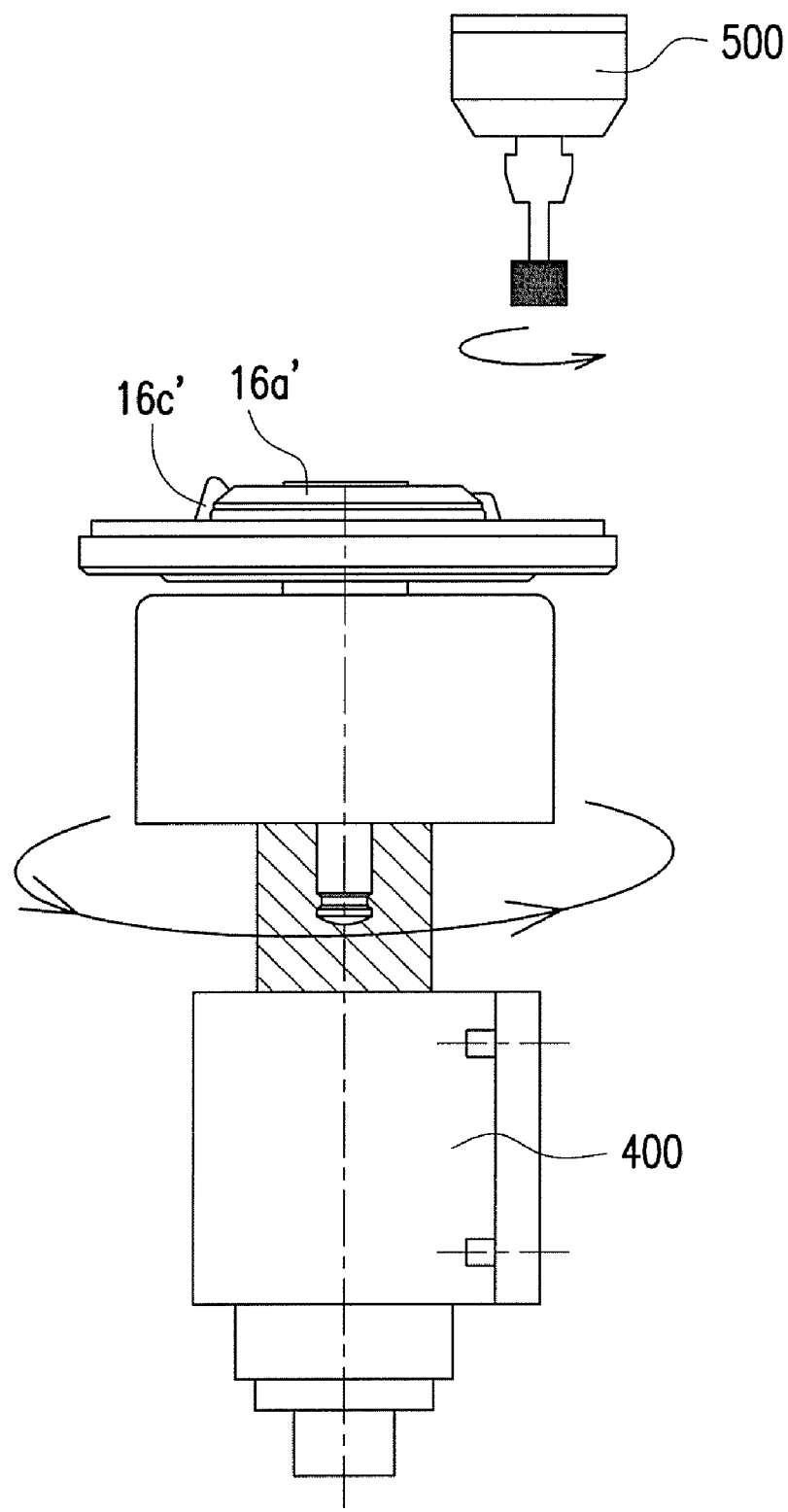
FIG. 5A is a schematic diagram for illustrating a material removing device for removing a part of the previously added material from the engaging spring, according to a second embodiment of the invention.

The method for obtaining the testing result is as illustrated in the first embodiment. FIG. 5A is a schematic diagram for illustrating the removal of a part of a previously added material from the engaging springs using a material removing device, according to the second embodiment of the invention. Referring to FIGS. 3A and 5A, the steps for adding material to an engaging spring and for removing a part of the previously added material from the engaging springs includes: First, a second support unit 400, a material adding device 300, and a material removing device 500 are provided. Material is then added to at least one of the engaging springs 16c using the material adding device 300 to form an engaging spring 16c'. Later, referring to FIG. 5A, a turntable 16a' having an engaging spring 16c' is secured on the second support unit 400. Then the second support unit 400 is used to drive the turntable 16a' to rotate. A part of the previously added material is removed from the engaging spring 16c' using the material removing device 500.

It should be noted that the material added to the engaging spring 16c can be either the same or not the same with the original material of the engaging spring 16c. The method for securing the turntable 16a' onto the second support unit 400 is the same as illustrated in the first embodiment.

Figure 5B:
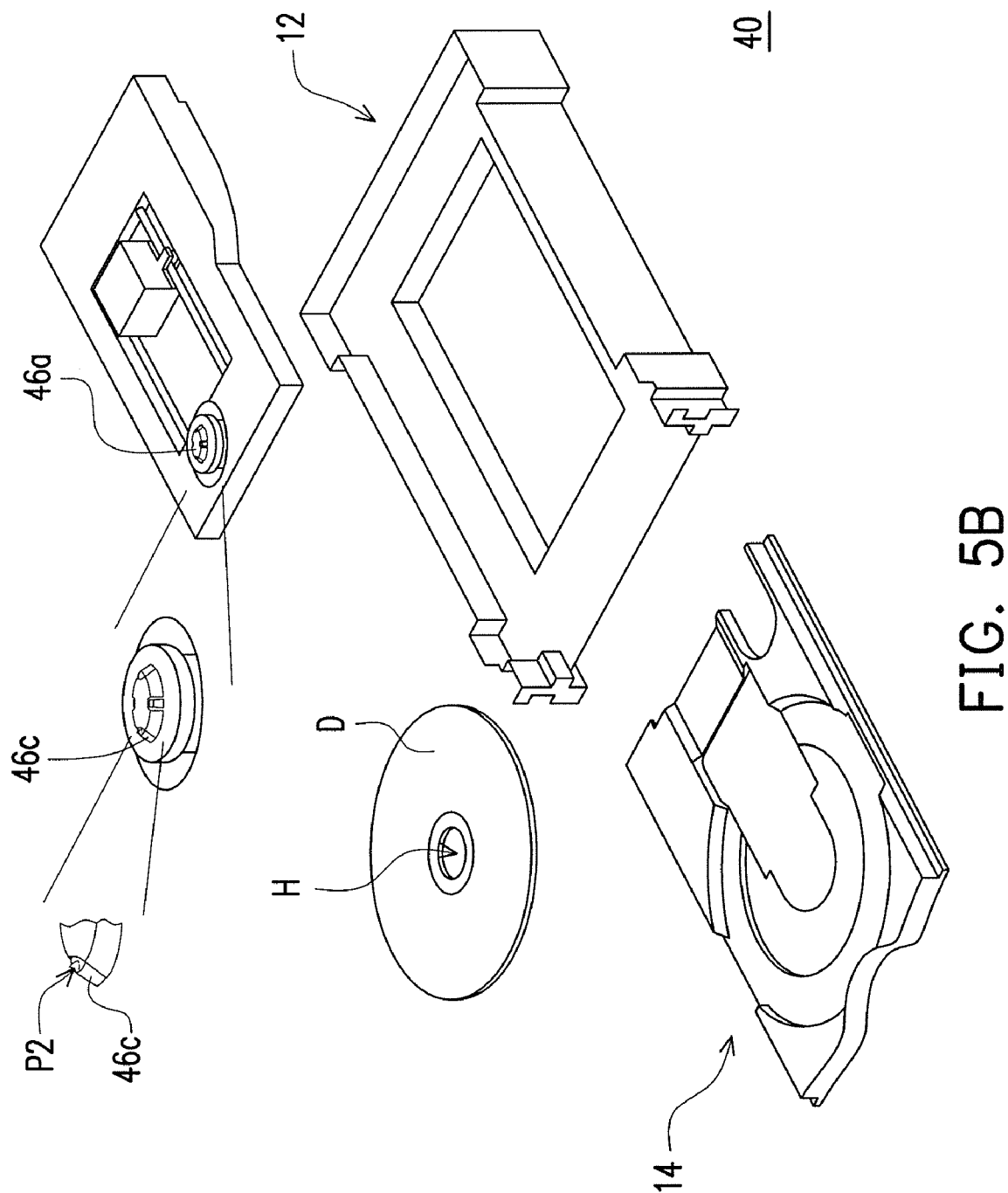
FIG. 5B is a schematic diagram for illustrating an optical disk drive after the completion of the steps in FIG. 3A.

FIG. 5B is a schematic diagram for illustrating an optical disk drive after completion of steps in FIGS. 3A and 5A. Referring to FIG. 5B, the optical disk drive 40 is different from the conventional optical disk drive in that at least one engaging spring 46c of the turntable 46a includes a corresponding portion P2 having a added material wherein a part of which is removed, and the corresponding portion P2 is adapted to make the center of the optical disk D and the center of the turntable 46a to be superposed.

Finally, it is to be understood that optical disk drives 20, 30, and 40 are exemplary for desktop computers. However, the method for fabrication of an optical disk drive according to the invention can also be used for laptop computers; therefore, the aforementioned embodiments are exemplary as illustration, and not to limit the scope of the invention.

In summary, after testing and modification using the fabrication method of an optical disk drive according to the present invention, the modified engaging springs of the turntable can make the center of the optical disk and the center of the turntable to be superposed. Therefore, when a user uses the optical disk drive, the reading speed and the reliability of the read data are all largely increased. Also, the fabrication method of an optical disk drive according to the invention can increase quality of products, thus the production cost is reduced.

It should be noted that specific embodiments of, and examples for, the invention are described herein for illustrative purposes, various equivalent modifications are possible within the scope of the invention, as those skilled in the relevant art will recognize that modifications and adaptations of the above-described embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An optical disk drive, adapted for reading data from an optical disk, wherein the optical disk drive comprises:
   a housing;
   a tray, disposed in the housing and adapted for ejecting from the housing; and
   a read module, disposed in the housing and adapted for reading data from the optical disk, wherein the read module comprises:
      a turntable having a plurality of engaging springs, wherein at least one of the engaging springs comprises an adding material for superposing the center of the optical disk and the center of the turntable; and
      an optical read head, adapted for moving along a tracking path for reading data from the optical disk.

2. The optical disk drive according to claim 1, wherein the material added to the engaging spring is identical with the original material for the engaging spring.

3. The optical disk drive according to claim 1, wherein the material to be added to the engaging spring is not identical with the original material for the engaging spring.

4. An optical disc drive, adapted for reading data from an optical disk, wherein the optical disk drive comprises:
   a housing;
   a tray, disposed in the housing and adapted for ejecting from the housing; and
   a read module, disposed in the housing and adapted for reading data from the optical disk wherein the read module comprises:
      a turntable having a plurality of engaging springs, wherein at least one of the engaging springs comprises a corresponding portion wherein a part of material is removed for superposing the center of the optical disk and the center of the turntable; and
      an optical read head, adapted for moving along a tracking path for reading data from the optical disk.

* * * * *